(12) United States Patent
Gibbs

(10) Patent No.: US 7,766,709 B2
(45) Date of Patent: Aug. 3, 2010

(54) AMPHIBIOUS VEHICLE STEERING

(75) Inventor: Alan Timothy Gibbs, London (GB)

(73) Assignee: Gibbs Technologies, Ltd. (IM)

( * ) Notice: Subject to any disclaimer, the term of this patent is extended or adjusted under 35 U.S.C. 154(b) by 0 days.

(21) Appl. No.: 10/554,178

(22) PCT Filed: Apr. 19, 2004

(86) PCT No.: PCT/GB2004/001697

§ 371 (c)(1),
(2), (4) Date: Oct. 21, 2005

(87) PCT Pub. No.: WO2004/096586

PCT Pub. Date: Nov. 11, 2004

(65) Prior Publication Data

US 2006/0219146 A1    Oct. 5, 2006

(30) Foreign Application Priority Data

Apr. 25, 2003 (GB) .................. 0309452.1

(51) Int. Cl.
*B60F 3/00* (2006.01)
*B63H 19/08* (2006.01)

(52) U.S. Cl. .............. 440/12.54; 440/12.51; 440/12.52; 440/12.53

(58) Field of Classification Search ...... 440/12.5–12.54
See application file for complete search history.

(56) References Cited

U.S. PATENT DOCUMENTS

| 5,590,617 A * | 1/1997 | Gere et al. ............... 440/12.51 |
| 5,727,494 A * | 3/1998 | Caserta et al. ........... 114/55.51 |
| 5,769,021 A * | 6/1998 | Schad ....................... 440/12.5 |
| 6,796,856 B2 * | 9/2004 | Roycroft et al. ......... 440/12.51 |
| 7,004,801 B2 * | 2/2006 | Bryham .................... 440/12.54 |
| 2002/0002939 A1 | 1/2002 | Beauchesne et al. | |

FOREIGN PATENT DOCUMENTS

DE    3820967    1/1989

(Continued)

OTHER PUBLICATIONS

International Search Report from PCT/GB04/001697.

(Continued)

*Primary Examiner*—Daniel V Venne
(74) *Attorney, Agent, or Firm*—Calfee, Halter & Griswold LLP

(57) ABSTRACT

An amphibious vehicle has retractable wheels (2, 3) attached to hubs (2), and a planing hull (10, 11, 3). Front wheels are arranged to be steered by a power assisted transversely mounted element (16), which may be a rack and pinion unit. The element may be linked to the wheels by links (14, 14'), which fold up to position (14") when the wheels are retracted. Actuating rod (28) is mounted to said element, and arranged for transverse movement. A flexible coupling means, such as cable (34) and sleeve (36), connects rod (28) to a steerable part (42, 4) of a marine propulsion unit, to effect marine steering. Road and marine steering may be operable simultaneously. More than one front steered axle, and/or marine propulsion unit, may be fitted. The steering system is readily adapted to all kinds of power assisted steering, and also to "steer by wire".

19 Claims, 4 Drawing Sheets

FOREIGN PATENT DOCUMENTS

| | | | |
|---|---|---|---|
| DE | 3820967 A1 * | 1/1989 | |
| JP | 1030883 | 2/1989 | |
| JP | 5010198 | 2/1993 | |
| WO | WO 02/08000 | 1/2002 | |
| WO | WO 02/28695 | 4/2002 | |
| WO | WO 02/44006 | 6/2002 | |
| WO | WO 03/037663 | 5/2003 | |

OTHER PUBLICATIONS

English translation of Office Action received in Japanese Application No. 2006-506151, mailed Jun. 25, 2009.

* cited by examiner

AMPHIBIOUS VEHICLE STEERING

CROSS REFERENCE TO RELATED APPLICATIONS

The present application is the U.S. national phase entry of PCT/GB04/001697 with an international filing date of Apr. 19, 2004 and claims priority from GB Patent Application Serial No. 0309452.1, filed Apr. 25, 2003.

FIELD OF THE INVENTION

The present invention relates to amphibious vehicle steering.

BACKGROUND OF THE INVENTION

Amphibious vehicles, hereafter "amphibians", are frequently steered in their land and marine modes by the same steering wheel. A simple form of amphibian steering is shown in U.S. Pat. No. 5,727,494 (Caserta). In Caserta's proposal, a steering cable is arranged between a rear propulsion unit and the inner shaft of the steering column, which the cable is wound around, and thence back to the marine propulsion unit. Whilst this is a simple arrangement, it is unsuitable for high speed planing amphibians, where the force required to steer the propulsion unit is high. That is, the mechanical advantage of the Caserta arrangement is low. Where an automotive steering column is used, there is a high risk that the steering cable according to Caserta will conflict either with the mechanism designed to ensure crushability of the steering column in an accident; or alternatively, with any telescopic adjustment mechanism designed to ensure an ergonomic driving position.

In another proposal shown in U.S. Pat. No., 5,590,617 (Gere), the linkages between the rear marine propulsion unit and the steering arrangement at the front of the vehicle are bulky and heavy, at a location at the front of the vehicle where weight has to be carefully controlled in a planing amphibian. Furthermore, the steering according to Gere is conformed so as to be operable in either a road mode or a marine mode. To allow this duality, the road steering system depends for operation on the steering rack being held in place by pressurized pneumatic rams. This is somewhat alarming from a safety viewpoint.

It is considered advantageous to have road and marine steering system which can be operated simultaneously. This simplifies control systems, as there are less changes to be made in converting from road mode to marine mode or vice versa. Also, when maneuvering at low speed in water, particularly to direct an amphibian to a slipway, the steering effect of dependent road wheels may be at least as great as that of, for example, a steering nozzle attached to a jet drive. Furthermore, if both systems can be operated together, there is no need for complex systems to ensure that when one or the other system is switched in, it is always initially centered. Finally, there is a safety advantage, in that in the unlikely event of breakage or seizure of the steering cable, a second steering system is available. In this context, it should be noted that the marine steering is self-centering. In the absence of any control input or restraint of movement, passage of water through the jet nozzle will tend to center the nozzle.

SUMMARY OF THE INVENTION

It is an object of the invention to provide a steering system for a planing plan amphibian in which the steering system is balanced, so that power assistance to the road steering matches the power assistance required to overcome the self centering centring tendency of the marine propulsion unit running at high speed. Another object is to reduce the bulk of parts of the steering assembly in the region between the front wheels, which have to retract to reduce water resistance in a planing amphibious vehicle.

According to the invention, there is provided an amphibious vehicle having retractable wheels and a planing hull, a marine propulsion unit, front wheels arranged to be steered by means of a power assisted transversely mounted element, an actuating rod mounted to said element, the rod arranged for transverse movement, and a flexible coupling means connecting said actuating rod to a steerable part of the marine propulsion unit, so that transverse movement of said element steers the part of the marine propulsion unit.

Preferably, the element is linked by means of a link to each wheel, the links being arranged to fold upwards on refracting the wheels. Both road and marine steering may be arranged to be operated simultaneously. The transversely mounted element may be a rack and pinion steering system. The flexible coupling means is preferably a push-pull cable and a bell crank means attached to the actuating rod. The actuating rod may be mounted in front of a steering column. The push-pull cable arrangement, comprising a cable slidable in a sleeve, is readily arranged so as to fit between body members and the vehicle power train with a minimum bending radius of 150 mm. In one embodiment, the cable is between 12 and 13 mm in diameter, whilst the outer sleeve of the cable is between 15 and 17 mm in diameters.

The steering system may be readily adapted to a steering system comprising more than one steered front font-axle. It could also be adapted to a marine propulsion system comprising more than one marine propulsion unit.

BRIEF DESCRIPTION OF THE DRAWINGS

An embodiment of the invention will now be described by way of example with reference to the following drawings in which.

DETAILED DESCRIPTION OF THE INVENTION

Figure 1:
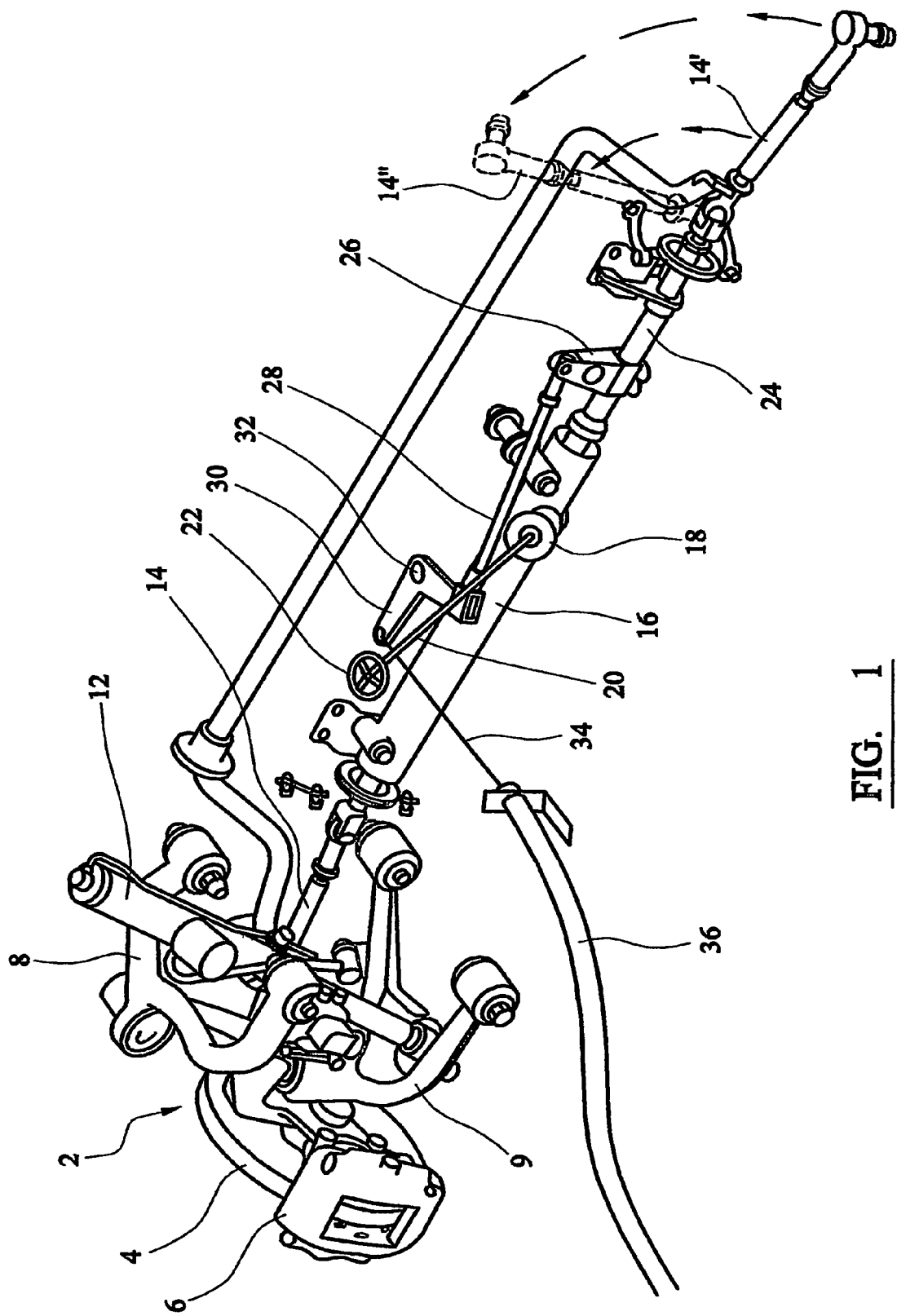
FIG. 1 is a perspective view from above and behind, of the front wheel steering arrangement of an amphibian with retractable wheels according to the invention.
Figure 2:
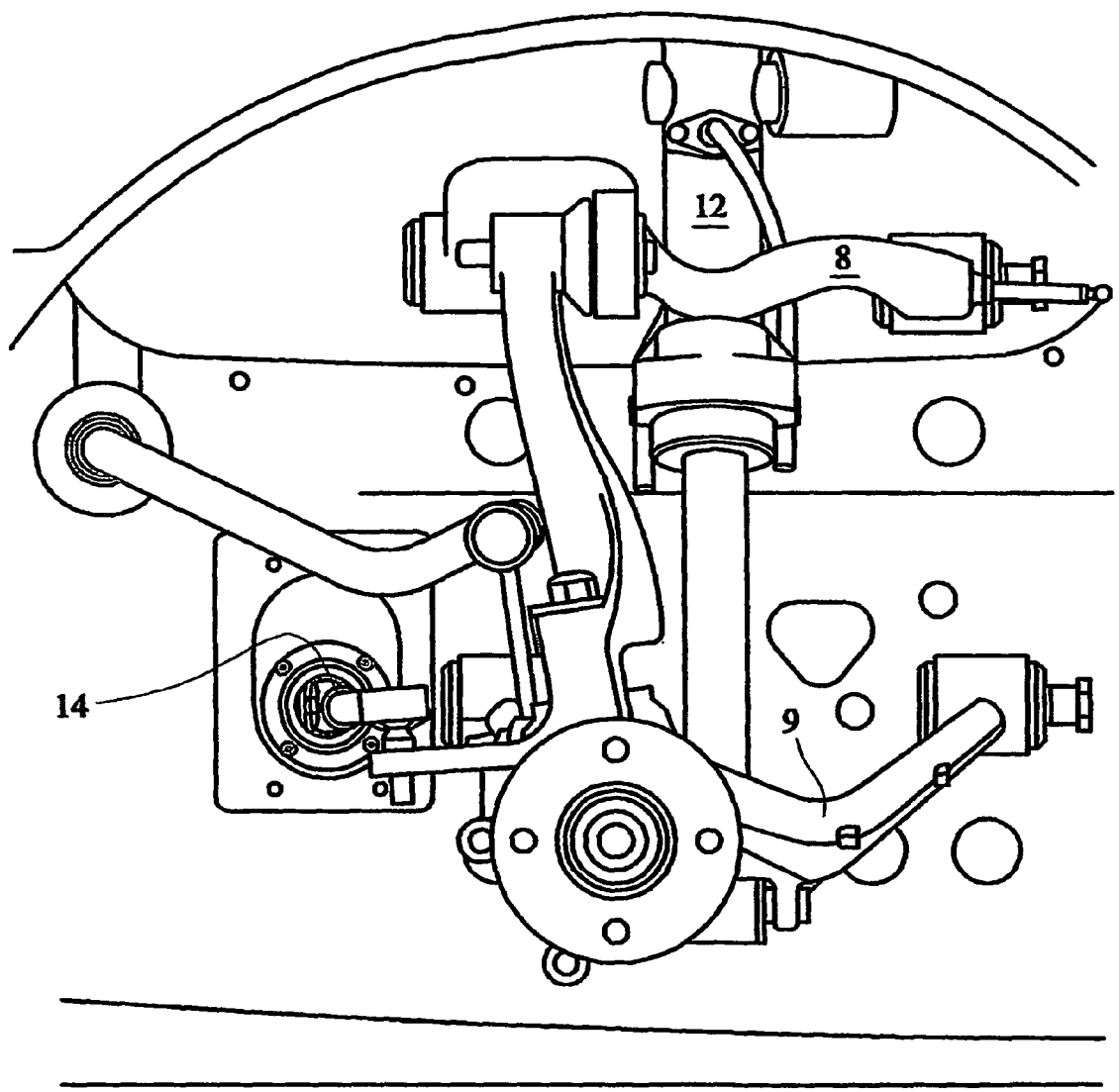
FIG. 2 is a side view of one front wheel arrangement of the amphibian of FIG. 1 in road mode, with the front wheel removed for clarity.
Figure 3:
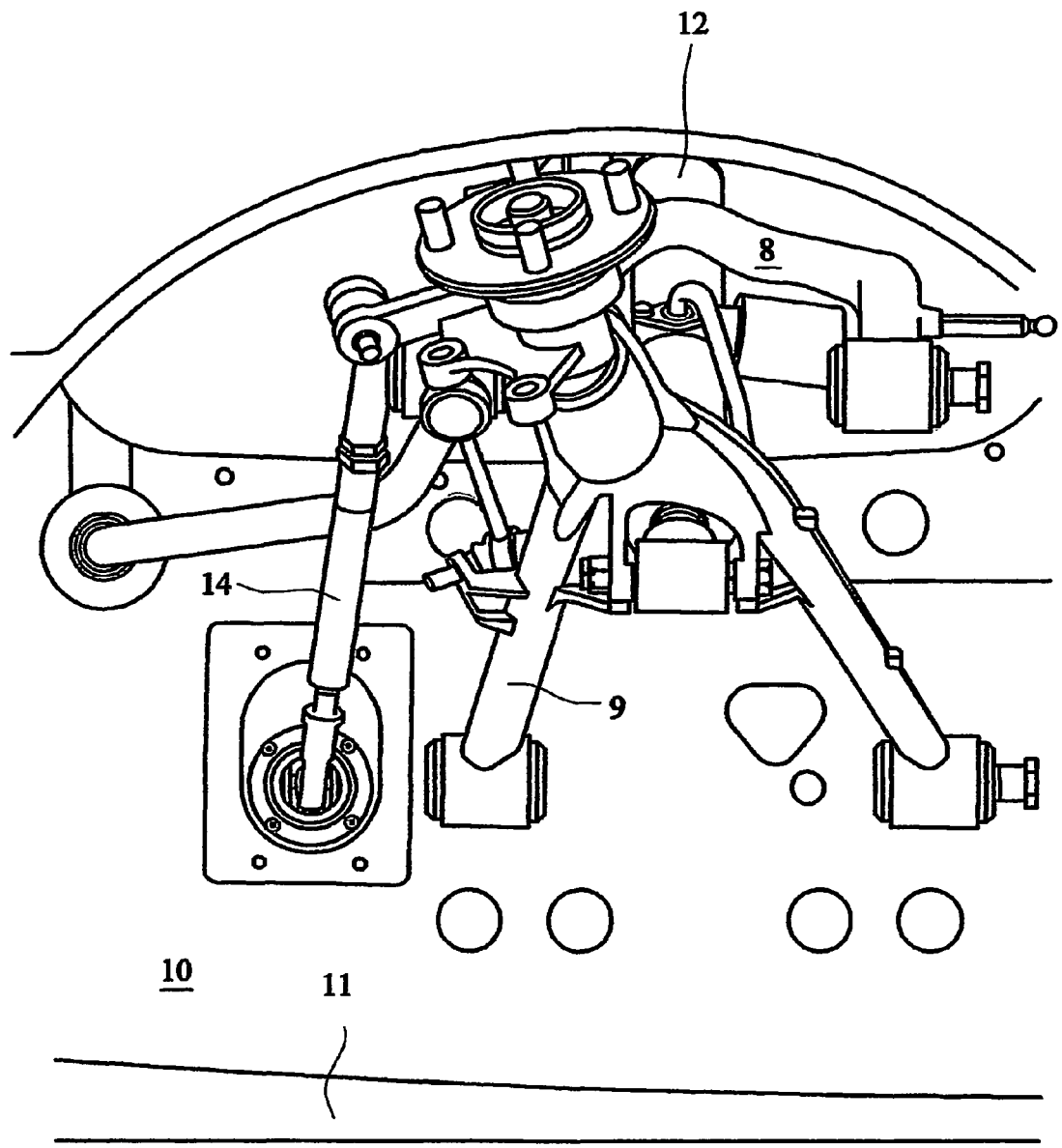
FIG. 3 is a side view of the front wheel arrangement of FIG. 2, in the wheel retracted position in marine mode.
Figure 4:
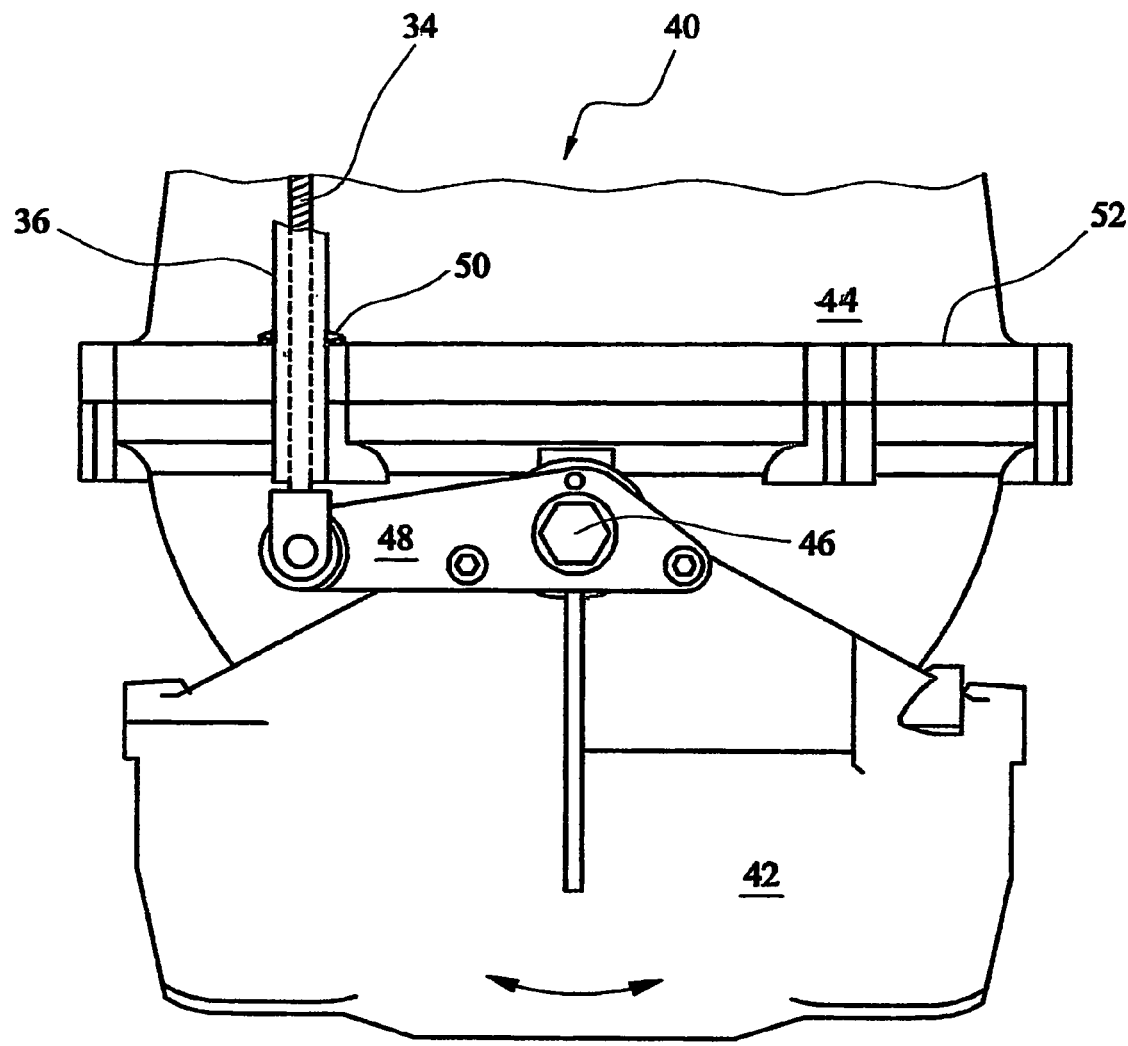
FIG. 4 is a plan view of a marine propulsion unit of the amphibian of FIG. 1, as steered by the de steering arrangement of FIG. 1.

In the drawings, FIG. 1 shows on the left the front wheel hub assembly 2 with brake disc 4 and brake caliper 6. The hub assembly 2 is mounted to upper and lower wishbones 8 and 9, which enable piston and cylinder arrangement 12 to raise the front wheel from the position shown in FIG. 2 to that shown in FIG. 3. In doing so, link 14 (there is the same arrangement on the other side, shown at 14') folds upwards to the position 14" shown in broken lines in FIG. 1. (The folded position 14" is shown for link 14', for clarity). FIG. 3 also shows part of the hull 10 to which wishbones 8 and 9 arm mounted via a mounting plate (omitted for clarity). The hull 10 has a planing bottom 11.

Coupled to links 14 and 14' is power assisted transversely mounted steering rack unit 16, actuated by a pinion in housing 18; which in turn is actuated by an inner steering column on axis 20, and finally by a steering wheel 22, shown diagrammatically at a severely reduced scale for clarity.

The rack movement is some 114 mm lock to lock, whilst the steering wheel has 2,3 turns from lock to lock. Mounted to rack arm 24 is bracket 26, to which is in turn mounted link rod 28; to the other end of which is mounted bell crank 30. Crank 30 is pivoted about pivot 32, and coupled to push-pull cable 34; which is slidably mounted in flexible casing or sleeve 36. The coupling between rack arm 24 and bell crack 30 is such that rod 28 is in front of steering column 20. This ensures economy of space.

The rack movement is some 114 mm lock to lock, whilst the steering wheel has 2,3 turns from lock to lock. Mounted to rack arm 24 is bracket 26, to which is in turn mounted link rod 28; to the other end of which is mounted bell crank 30. Crank 30 is pivoted about pivot 32, and coupled to push-pull cable 34; which is slidably mounted in flexible casing or sleeve 36. The coupling between rack arm 24 and bell crank 30 is such that rod 28 is in front of steering column 20. This ensures economy of space.

It should be noted that further refinements may be made to the steering system described above without departing from the essential inventive concept. For example, the system is particularly suited to be adapted to a road steering system using "steer by wire"; that is, not having a mechanical linkage between the steering wheel and the transversely mounted steering element. Such a system would be particularly advantageous to a amphibian, in that the bulkhead ahead of the driver would be more easily sealed against passage of water without a conventional steering column passing therethrough. The power assisted steering system may be hydraulic, hybrid hydraulic/electric, electric, or magnetic. The input to the marine steering system could be taken from a steered rear axle. This would, however, require some means of control which accounted for the fact that most rear wheel steering systems sometimes steer the rear wheels out of phase with the front wheels; and sometimes in phase with them.

Where two or more marine propulsion units are used, their steering nozzles may be mechanically linked to ensure that they turn in phase with each other. Such a linkage may have some geometry comparable to Ackermann geometry for road steering. Where two or more front steered axles are used, they may both have hydraulic cylinders to steer their respective wheels. With two steered front axles and two marine drives, a cable could be taken from each steered axle to a respective marine drive.

The fixing of the cable sleeve to the jet flange described above is a simple and cheap solution. It may be preferred to fix the cable sleeve to a jet flange by means of a bracket and locknuts, thereby allowing longitudinal adjustment of the cable sleeve; as is known in the marine engineering art.

The steering system described offers a fixed ratio between road and marine steering, which is fixed at the design stage by the lengths of the arms on the bell crank. The drawback of such a fixed ratio is considered to be outweighed by the system's compactness, simplicity, and light weight; each of which are particularly helpful where retractable wheels are fitted.

The invention claimed is:

1. A planing amphibious vehicle comprising:
   a retractable wheel hub assembly pivotally coupled to the vehicle and configured to be raised relative to the vehicle from a road position to a marine position;
   a power assisted steering unit coupled to the vehicle and comprising a steering arm, wherein the steering arm is actuated by rotation of a steering column to move the steering arm relative to the vehicle, and wherein the steering arm is coupled to the wheel hub assembly and configured to permit the wheel hub assembly to be raised from the road position to the marine position;
   a bracket coupled to the steering arm and configured to move with the steering arm relative to the vehicle;
   a bell crank pivotally coupled to the vehicle and configured to pivot about a pivot point;
   a rod coupling the bracket to the bell crank, wherein the rod transmits the movement of the steering arm to the bell crank to pivot the bell crank about the pivot point;
   a marine propulsion unit having a steerable portion pivotally coupled to the vehicle; and
   a cable coupling the bell crank to the steerable portion of the marine propulsion unit, wherein the cable transmits the movement of the bell crank to pivot the steerable portion of the marine propulsion unit.

2. The planing amphibious vehicle according to claim 1, wherein the vehicle comprises at least two retractable wheel hub assemblies pivotally coupled to the vehicle and configured to be raised relative to the vehicle from a road position to a marine position, and wherein the steering arm is coupled by means of a link to each wheel hub assembly, the links configured to pivot relative to the steering as each wheel hub assembly is raised from the road position to the marine position.

3. The planing amphibious vehicle according to claim 1, wherein the power assisted steering unit is a rack and pinion steering system comprising a housing coupled to the vehicle, a rack arm, and a pinion, and wherein the pinion is actuated by rotation of the steering column to move the rack arm relative to the housing.

4. The planing amphibious vehicle according to claim 1, further comprising at least two axles, each axle coupled to at least one wheel hub assembly and arranged to be steered by means of at least the steering arm.

5. The planing amphibious vehicle according to claim 1, wherein the steering of the wheel hub assembly and the marine propulsion unit steering are arranged to be operated simultaneously using the power assisted steering unit such that the power assistance to the steering of the wheel hub assembly matches the power assistance required to overcome the self centering tendency of the marine propulsion unit when running at high speed.

6. The planing amphibious vehicle according to claim 1, wherein a link couples the steering arm to the wheel hub assembly, and wherein the link is configured to pivot relative to the steering arm as the wheel hub assembly is raised from the road position to the marine position.

7. The planing amphibious vehicle according to claim 1 further comprising at least a front axle and a rear axle, wherein the steering arm is located in front of the front axle of the vehicle.

8. The planing amphibious vehicle according to claim 1, wherein the rod is located in front of the steering column of the vehicle.

9. The planing amphibious vehicle according to claim 1, wherein the length of the rod is adjustable to align the steering of the wheel hub assembly and the steering of the marine propulsion unit.

10. The planing amphibious vehicle according to claim 1, wherein the wheel hub assembly is coupled to the vehicle by an upper wishbone and a lower wishbone.

11. The planing amphibious vehicle according to claim 1, wherein the wheel hub assembly is configured to be raised relative to the vehicle by a piston and a cylinder.

12. The planing amphibious vehicle according to claim 1, wherein the steerable portion of the marine propulsion unit comprises a steering nozzle pivotally coupled to a propulsion conduit housing.

13. The planing amphibious vehicle according to claim 1, wherein, as the steering arm moves to the left relative to the vehicle, the bell crank pivots in a clockwise direction relative to the vehicle and pulls the cable to pivot the steerable portion of the marine propulsion unit in a clockwise direction relative to the vehicle.

14. The planing amphibious vehicle according to claim 1, wherein the cable is a push-pull cable.

15. The planing amphibious vehicle according to claim 14, wherein, as the steering arm moves to the right relative to the vehicle, the bell crank pivots in a counterclockwise direction relative to the vehicle and pushes the cable to pivot the steerable portion of the marine propulsion unit in a counterclockwise direction relative to the vehicle.

16. A planing amphibious vehicle comprising:
a retractable wheel hub assembly pivotally coupled to the vehicle and configured to be raised relative to the vehicle from a road position to a marine position;
a power assisted steering unit comprising a housing coupled to the vehicle, a rack arm, and a pinion, wherein the pinion is actuated by rotation of a steering column to move the rack arm relative to the housing;
a first link coupling the rack arm to the wheel hub assembly, wherein the first link is configured to pivot relative to the rack arm as the wheel hub assembly is raised from the road position to the marine position;
a bracket coupled to the rack arm and configured to move with the rack arm relative to the housing;
a bell crank pivotally coupled to the vehicle and configured to pivot about a pivot point;
a second link coupling the bracket to the bell crank, wherein the second link transmits the movement of the rack arm to the bell crank to pivot the bell crank about the pivot point;
a marine propulsion unit having a steerable portion pivotally coupled to the vehicle; and
a cable coupling the bell crank to the steerable portion of the marine propulsion unit, wherein the cable transmits the movement of the bell crank to pivot the steerable portion of the marine propulsion unit.

17. The planing amphibious vehicle according to claim 16 further comprising at least a front axle and a rear axle, wherein the steering arm is located in front of the front axle of the vehicle.

18. The planing amphibious vehicle according to claim 16, wherein the length of the second link is adjustable to align the steering of the wheel hub assembly and the steering of the marine propulsion unit.

19. A planing amphibious vehicle comprising:
two retractable wheel hub assemblies coupled to an axle of the vehicle and configured to be raised relative to the vehicle from a road position to a marine position, wherein each wheel hub assembly is pivotally coupled to the vehicle by an upper wishbone and a lower wishbone, and wherein each wheel hub assembly is configured to be raised relative to the vehicle by a piston and a cylinder;
a power assisted steering unit located in front of the axle comprising a housing coupled to the vehicle, a rack arm, and a pinion, wherein the pinion is actuated by rotation of a steering column to move the rack arm relative to the housing;
at least two links coupling the rack arm to each wheel hub assembly, wherein each link is configured to pivot relative to the rack arm as each respective wheel hub assembly is raised from the road position to the marine position;
a bracket coupled to the rack arm and configured to move with the rack arm relative to the housing;
a bell crank pivotally coupled to the vehicle and configured to pivot about a pivot point;
an actuating rod located in front of the steering column and coupling the bracket to the bell crank, wherein the actuating rod transmits the movement of the rack arm to the bell crank to pivot the bell crank about the pivot point;
a marine propulsion unit having a steerable portion pivotally coupled to the vehicle, wherein the steerable portion of the marine propulsion unit comprises a steering nozzle pivotally coupled to a propulsion conduit housing; and
a push-pull cable coupling the bell crank to the steerable portion of the marine propulsion unit, wherein the push-pull cable transmits the movement of the bell crank to pivot the steerable portion of the marine propulsion unit;
wherein the length of the actuating rod is adjustable to align the steering of the wheel hub assemblies and the steering of the marine propulsion unit, and wherein the steering of the wheel hub assemblies and the steering of the marine propulsion unit are arranged to be operated simultaneously using the power assisted steering unit such that the power assistance to the steering of the wheel hub assemblies matches the power assistance required to overcome the self centering tendency of the marine propulsion unit when running at high speed.

* * * * *